United States Patent [19]
Tjeerdsma

[11] Patent Number: 5,231,940
[45] Date of Patent: Aug. 3, 1993

[54] SEED PLANTER ATTACHMENT FOR SELECTIVE ROW SHUT OFF

[75] Inventor: Wayne D. Tjeerdsma, Avon, S. Dak.

[73] Assignee: Elton A. Rokusek, Tyndall, S. Dak.; a part interest

[21] Appl. No.: 850,962

[22] Filed: Mar. 11, 1992

[51] Int. Cl.$^5$ ............................................. A01C 7/20
[52] U.S. Cl. ..................... 111/182; 111/179; 221/211; 221/278
[58] Field of Search ............... 111/170, 174, 178, 179, 111/180, 181, 182; 221/211, 278

[56] References Cited

U.S. PATENT DOCUMENTS

| | | | |
|---|---|---|---|
| 3,757,996 | 9/1973 | Lienemann et al. | 221/211 |
| 3,790,026 | 2/1974 | Neumeister | 221/278 X |
| 3,848,552 | 11/1974 | Bauman et al. | 111/77 |
| 3,891,120 | 6/1975 | Loesch et al. | 221/278 X |
| 3,964,693 | 6/1976 | Thomas | 243/24 |
| 4,026,437 | 5/1977 | Biddle | 111/179 X |
| 4,148,414 | 4/1979 | Parks, Jr. | 221/278 |
| 4,159,064 | 6/1979 | Hood | 221/8 |
| 4,184,610 | 1/1980 | Thiele et al. | 221/251 X |
| 4,210,260 | 7/1980 | Luttrell | 221/278 |
| 4,239,126 | 12/1980 | Dobson et al. | 221/211 |
| 4,280,419 | 7/1981 | Fischer | 111/80 |

Primary Examiner—David H. Corbin
Assistant Examiner—Spencer Warnick
Attorney, Agent, or Firm—Jacobson, Price, Holman & Stern

[57] ABSTRACT

An attachment for pneumatic seed planters in which a multiple of rows are planted simultaneously during a single pass of the planter. The attachment enables selected rows to be shut off by preventing seeds from being discharged in a particular row or rows such as when planting in overlapping rows which occurs when making a final pass when planting at the edge of a field. The attachment in one embodiment includes a plurality of manually positioned release wheels and in another embodiment includes a plurality of solenoid positioned release wheels which release the pneumatic pressure associated with a pressurized drum having holes aligned with the number of rows the planter will plant to selectively prevent seed from being discharged into selected tubes which lead to the planting shoes.

9 Claims, 2 Drawing Sheets

SEED PLANTER ATTACHMENT FOR SELECTIVE ROW SHUT OFF

BACKGROUND OF THE INVENTION

1. Field of the Invention

The present invention generally relates to seed planters and more specifically to an attachment for pneumatic seed planters in which a multiple of rows are planted simultaneously during a single pass of the planter. The attachment of the present invention enables selected rows to be shut off by preventing seeds from being discharged in a particular row or rows such as when planting in overlapping rows which occurs when making a final pass with the planter when planting at the edge of a field. The attachment in one embodiment includes a plurality of manually positioned seed release wheels and in another embodiment includes a plurality of solenoid positioned seed release wheels which release the pneumatic pressure associated with a pressurized drum having holes aligned with the number of rows the planter will plant to selectively prevent seed from being discharged into selected tubes which lead to the planting shoes.

2. Description of the Prior Art

Pneumatic seed planters are well known and have been commercially developed. The following U.S. patents relate to this type of planter.

U.S. Pat. No. 3,848,552
U.S. Pat. No. 3,964,693
U.S. Pat. No. 4,159,064
U.S. Pat. No. 4,239,126
U.S. Pat. No. 4,280,419

One type of pneumatic planter that is currently being marketed contains a pneumatic seed delivery system which includes a pneumatically pressurized drum having a plurality of peripherally arranged rows of holes corresponding with the number of rows the planter is capable of planting. A regulated quantity of seed is placed in the bottom of the drum which is rotated and as the drum rotates, the pneumatic pressure forces seed into the holes which are sufficiently small to prevent passage of the seed but enables passage of air in order that the air pressure will hold the seeds in the holes as they are carried toward the top of the drum. At the top of the drum or at some point above the quantity of seed in the bottom of the drum, seed release wheels engage the drum and release the pressure holding the seed in the holes thus dropping the seed into a manifold of air tubes communicating with the planting shoes with air pressure moving the seed through the manifold and tubes to the corresponding rows being planted.

When planting a row crop such as corn in a typical situation, in a 160 rod or ½ mile field with an 8 row planter, during the last pass of the planter at the edge of the field, there is only room for 2 additional rows to be planted thus requiring that 6 rows be overlapped since existing planters do not include any capability of shutting off the unnecessary rows. Thus, the existing procedure wastes the seed and, by overpopulating the overlapped rows, the crop yield is reduced. Based on current prices, the waste in seed corn may be as high as about $25.00 and the loss in yield may be as much as 25 bushels or approximately $50.00 thus resulting in an unnecessary expenditure of about $75.00 when planting this size field.

The prior art does not disclose any structure capable of selectively shutting off seed to selected rows to eliminate seed waste and reduce loss in yield which occurs when planting overlapped of rows of seed.

SUMMARY OF THE INVENTION

An object of the present invention is to provide an attachment for a pneumatic seed planter for planting row crops with the attachment providing the planter with the capability of selectively shutting off the supply of seed to certain of the rows being planted thereby eliminating overpopulation of seed in overlapped rows which are planted during the last pass of a planter in a field being planted.

Another object of the invention is to provide an attachment for pneumatic seed planters in accordance with the preceding object in which a plurality of selectively movable wheels are associated with the pressurized pneumatic drum on a seed planter to release seed from holes in the drum prior to the seeds being deposited in the manifold or tubes at the upper periphery of the drum with the attachment of this invention being located in circumferentially spaced relation to the existing release wheels and in advance of the existing release wheels to release the seed from the row of holes corresponding to the row which is to be shut off with the attachment release wheels functioning in the same manner as the existing release wheels but causing the pressure to be released in the holes thus releasing the seed prior to the seed reaching the existing seed release wheels.

A further object of the invention is to provide an attachment for pneumatic seed planters as set forth in the preceding objects with one embodiment of the invention including manually movable release wheels and another embodiment of the invention including solenoid operated release wheels to enable an operator of the planter to actuate the attachment wheels from a remote location by actuating electrical switches corresponding to the seed release wheels on the attachment to select the rows to be shut off from seed.

Still another object of the invention is to provide a row selection attachment for shutting off discharge of seed from a seed planter into selected rows which is quickly and easily attached to an existing pneumatic seed planter, effective in operation and relatively inexpensive to manufacture, install and maintain with the attachment resulting in considerable saving of seed and eliminating reduction in yield due to overpopulation of seed in overlapped planted rows.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
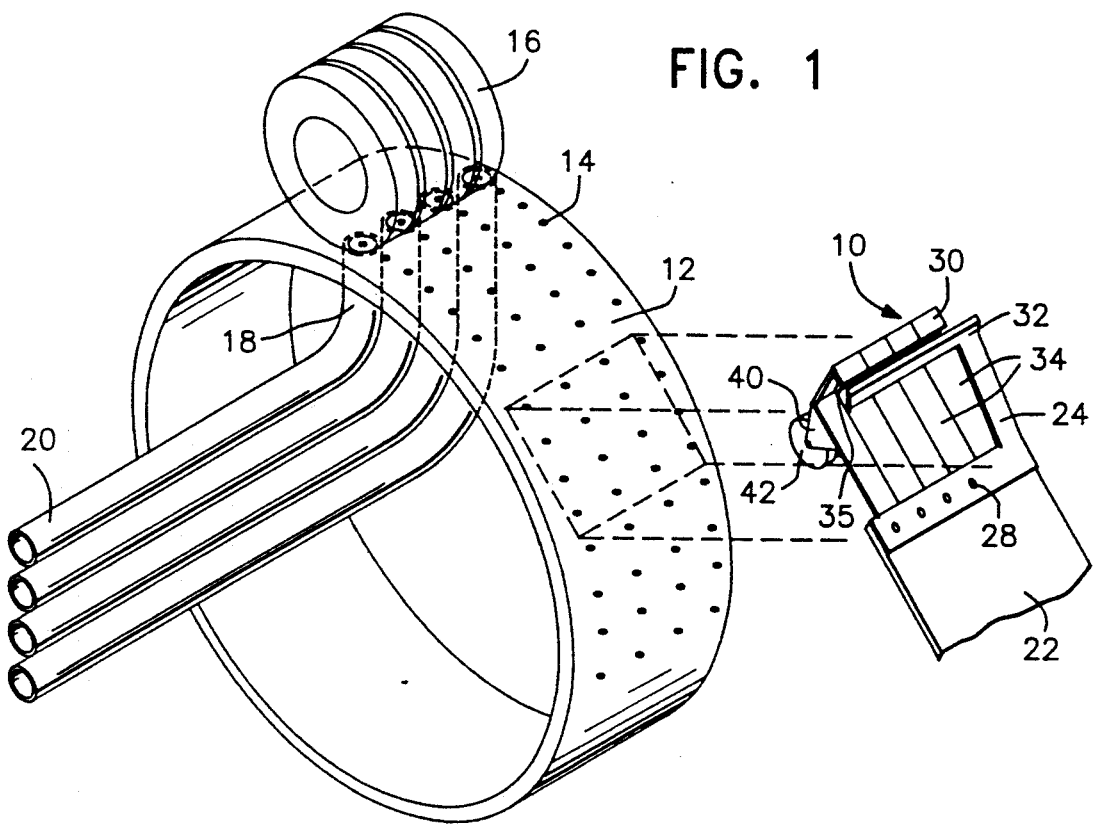
FIG. 1 is a schematic perspective view of the attachment of the present invention along with the revolving pressurized drum in a pneumatic seed planter, the existing seed release wheels and the existing manifold of tubes through which seed is discharged to planting shoes with the attachment being exploded away from the drum.
Figure 2:
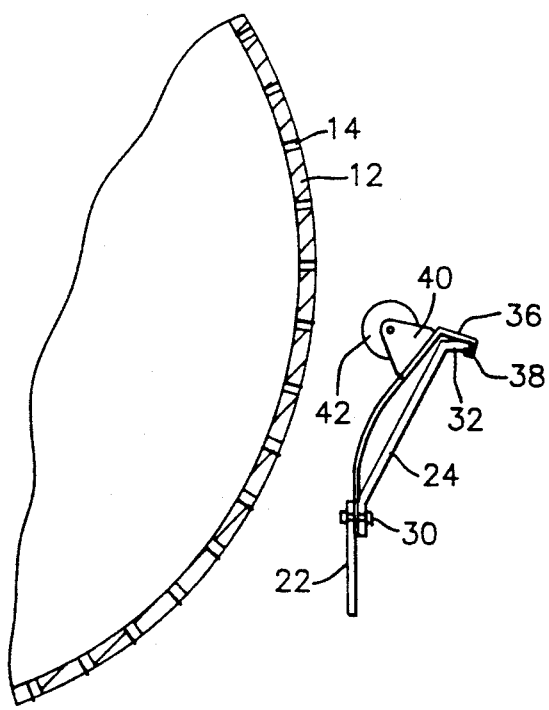
FIG. 2 is a fragmental sectional view illustrating the position of the release wheels when the release wheels of the attachment are in their inoperative position spaced from the drum.
Figure 3:
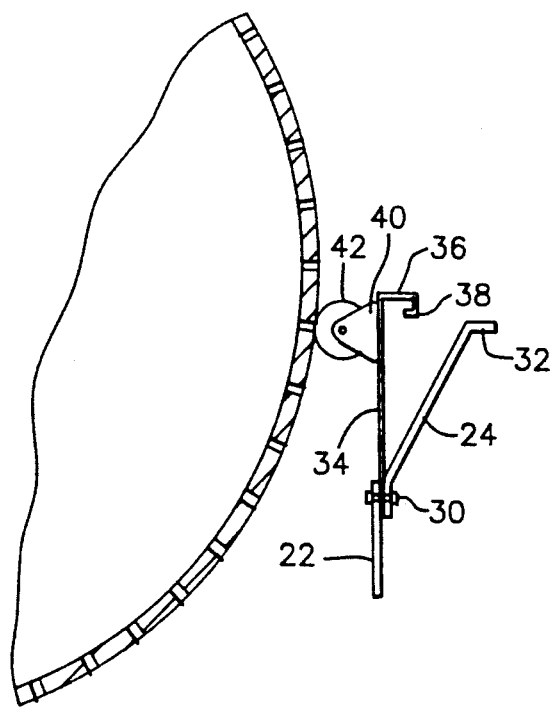
FIG. 3 is a sectional view similar to FIG. 2 but illustrating an attachment release wheel engaged with the periphery of the drum to release the seed from the holes in advance of the seed reaching the top of the drum and being released by the existing release wheels.

Referring now specifically to FIGS. 1-3, the attachment of the present invention is generally designated by reference numeral 10 and, in FIG. 1, is illustrated in perspective and spaced away from the rotatable pneumatically pressurized drum 12 found in pneumatic seed planters. The components of the existing pneumatic seed planter essential to the operation of the attachment are illustrated in FIG. 1 without the entire seed planter being illustrated. As is well known, the pneumatic seed delivery system includes the pressurized rotatably driven drum 12 having a plurality of peripherally arranged rows of holes 14 in the drum 12 with the number of rows of holes 14 corresponding with the number of rows the planter can plant. At the upper periphery of the drum 12, a plurality of rotatable release wheels 16 are positioned in engagement with the outer surface of the drum 12 and in alignment with the rows of holes 14. Also at the upper periphery of the drum 12 but located interiorly thereof and in alignment with the rows of holes 14 and the release wheels 16 is a plurality of tubes 18 defining a manifold with the tubes extending from the drum 12 as indicated at 20 for communication with the discharge shoes with the number of tubes 18 corresponding with the number of rows of holes 14 and the number of pressure release wheels 16. In operation, a quantity of seed is placed in the interior of the bottom portion of the drum and as the pressurized drum rotates, the air pressure internally of the drum will force seed into the holes 14 which are dimensioned to prevent passage of seed through the holes 14 with the air pressure internally of the drum holding the seed in the hole or in overlying relation to the hole. The seeds placed in the holes and held therein by the pneumatic pressure move with the rotating drum 12 until they reach the upper periphery of the drum at which point the release wheels 16 engaging the external surface of the drum 12 closes the holes 14 to prevent passage of air therethrough and equalizing the pressure around the periphery of the seed thus causing the seed to drop by gravity into the manifold of tubes 18. The structure and function of the pneumatic seed planter is conventional in and of itself and is commercially available and disclosed in the previously mentioned patents.

The attachment 10 of the present invention is supported from a frame member 22 or any other suitable support structure and includes a frame 24 having apertures 28 along one edge thereof for mounting on the support 22 in a conventional manner by the use of some type of fasteners 30. The frame 24 includes an outwardly extending flange 32 at the edge thereof opposite to the support structure 22. Also secured to the frame 24 by the fasteners 30 is a plurality of resilient mounting straps 34 supported by the fasteners 30 at their lower ends and including a lateral flange 36 terminating in a downturned and inturned hook 38 constructed so that it can engage with the free edge of the flange 32 as illustrated in FIG. 2 to retain the resilient mounting bands or straps 34 in an arcuate configuration rather than in the normal straight line configuration as illustrated in FIG. 3. Each mounting strap or band 34 includes support lugs 40 at the free end thereof on the surface opposite to the hook 38 and the support lugs rotatably journal pressure and seed release wheels 42 thereon with the number of mounting straps 34 and release wheels 42 corresponding with the number of rows of holes 14 in the drum 12 and also corresponding with the number of release wheels 16. Each of the straps or brackets 34 are independently operated and in their inoperative position, the hooks 38 are manually engaged with the flange 32 which retains the resilient straps 34 in arcuate configuration and retain the pressure and seed release wheels 42 in their inoperative position in spaced relation to the drum 12 and spaced from the holes 14 so that the holes 14 operate in the normal manner to convey seeds up to the top of the drum. However, when it is desired to not plant seeds in certain rows, the pressure and seed release wheels 42 related to the selected rows are released and thus are spring biased into operative position in engagement with the periphery of the drum 12 as illustrated in FIG. 3. The release of the selected wheels 42 is accomplished by disengaging the hook 38 from the flange 32 with the resiliency of the strap 38 biasing the released wheels 42 into engagement with the drum 12 and forming a closure for the holes 14 in the selected row or rows of holes thereby shutting off seed to the corresponding tube or tubes 18. After the planter has completed its pass with the selected release wheels in operative position as illustrated in FIG. 3, the release wheels 42 are moved to the inoperative position with the hooks 38 engaging the flange 32 thereby enabling the seed planter to operate normally to discharge seed to each row.

Figure 4:
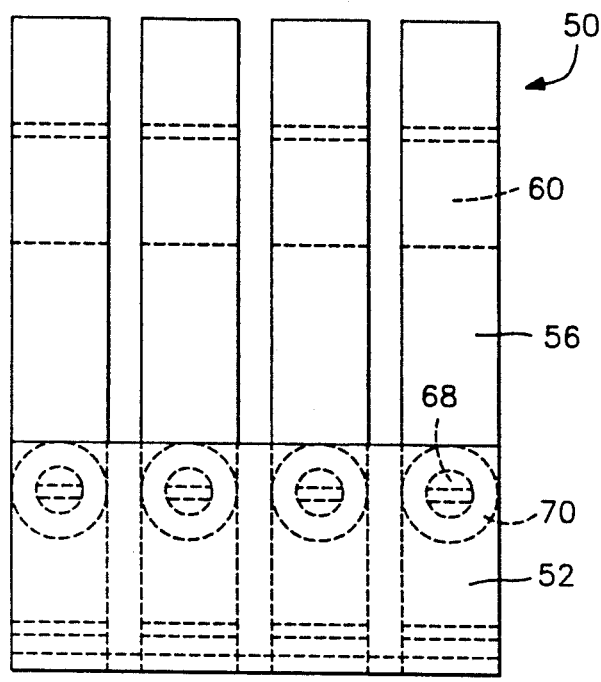
FIG. 4 is an elevational view of an embodiment of the invention utilizing solenoids to move the release wheels of the attachment between operative and inoperative positions.
Figure 5:
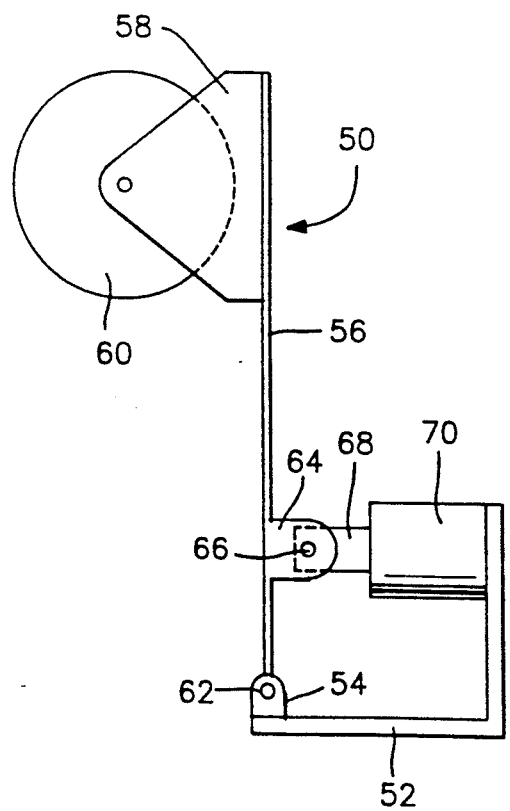
FIG. 5 is an end elevational view of the attachment as illustrated in FIG. 4.

FIGS. 4 and 5 illustrate another embodiment of the attachment generally designated by reference numeral 50 which includes a mounting structure 52 in the form of a bracket of generally L-shaped configuration with pivot lug 54 at one edge thereof for pivotally supporting a plurality of straps or brackets 56 each of which includes pivot lugs 58 at the upper ends thereof journaling pressure and seed release wheels 60 thereon which function in the same manner as the release wheels 42 in FIGS. 1-3. The mounting straps 56 are pivoted to the lugs 54 by pivot pins 62 and upwardly from the pivot pin 62 are attachment lugs 64 having an articulate connection 66 to the plunger or armature 68 of a solenoid 70 which is mounted at the upper end of the upstanding leg of the L-shaped bracket 52. The connection 66 between the plunger 68 and the mounting lugs 64 enables the mounting strap or bracket 56 to pivot about pivot pin 62 from an inoperative position spaced from the pneumatic pressure drum of the seed planter to an operative position with the release wheels 60 in rolling frictional contact with the pneumatic pressurized seed drum of the seed planter. This enables an operator of the seed planter to control operation of the plurality of solenoids 70 from a remote location by actuating appropriate electrical switches thereby enabling row selection to be accomplished at a remote point thereby facilitating the shutting off of seeds to selected rows being planted thereby eliminating wasted seed which occurs by overpopulating in overlapped planted rows with twice as much seed as should be deposited and also eliminating reduction in yield caused by such overpopulation of seed in the overlapped planted rows. While FIG. 1 illustrates the existing seed release wheels 16 at the top of drum 12, in some planters the existing seed release wheels are spaced circumferentially from the top of the drum but above the quantity of seed in the bottom of the drum. As an alternative construction, the seed release wheels 42 of the attachment can be individually spring biased toward drum 12 by various types of springs and movable or pivotal brackets. Also, in some instances, more than one seed release wheel can be mounted on the same bracket or mounting strap. Another alternative is mount the existing wheels on the planter on individual movable brackets rather than on a single axle or shaft as at present so they can be rendered operative or inoperative to control discharge of seeds by shutting off discharge of seeds to a selected row or rows.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In a seed planter having a generally horizontally disposed rotatably driven pneumatically pressurized drum, said drum including a row of circumferentially spaced, aligned holes, said drum receiving a quantity of seed in a lower portion thereof with pneumatic pressure retaining seeds in the holes as the drum rotates and moves the seeds upwardly to an elevated position toward an upper portion of the drum, means associated with the drum at an upper portion thereof to release the pressure and seed from the holes, and a discharge tube aligned with the holes in opposed relation to said means and interiorly of the drum to receive the seed released by said means, the improvement comprising means selectively releasing the seed back into the drum prior to release into said discharge tube by the means associated with the drum, said means associated with said drum including a stationarily supported pressure and seed release wheel rollingly engaging the drum at an upper portion thereof to release the seed from the holes, said releasing means including a movable release wheel, said movable release wheel being supported on a movable bracket means, and means causing the movable wheel to move between operative position in engagement with the drum and inoperative position in spaced relation to the drum thereby selectively shutting off discharge of seed into the tube by releasing the seed back into the drum prior to release into said discharge tube.

2. In a seed planter as defined in claim 1 wherein said means causing movement of the movable wheel includes said bracket means being a resilient supporting strap biasing said movable wheel into engagement with the drum, means on an end of said strap engaging a support structure to retain the strap flexed to retain the movable wheel spaced from the drum.

3. In a seed planter as defined in claim 2 wherein said means causing movement of the movable wheel includes said bracket means being a pivotal strap, solenoid means connected to said strap to move said movable wheel between operative and inoperative positions.

4. In a seed planter as defined in claim 1 wherein the drum includes multiple rows of holes, stationary release wheels and tubes to discharge seeds to a plurality of rows, and a plurality of movable release wheels aligned with said rows of holes and being independently movable between operative and inoperative positions for shutting off the discharge of seeds into selected rows thereby preventing discharge of seed in overlapped plant rows traversed by the seed planter at the edge of a field being planted by a multi-row planter thus saving seed and avoiding reduction in yield from overpopulation of seed in the overlapped plant rows.

5. An attachment for a pneumatic seed planter including a rotatably driven drum having a plurality of spaced circumferential rows of apertures in which seeds are held by air pressure difference between the interior and exterior of the drum, stationary rollers engaging the exterior of the drum to interrupt the air pressure difference to enable seed to be released from the apertures and deposited into a plurality of seed discharge tubes associated with said rows of apertures in opposed relation to said rollers, said rollers and discharge tubes being associated with an upper portion of the drum with rotation of the drum moving the seed from a lower portion of the drum toward an elevated position for discharge into said tubes, said attachment comprising a plurality of independently movably supported seed release wheels rollingly engaging the exterior of said rotatable seed drum to interrupt the air pressure difference across selected rows of apertures prior to such apertures and seeds therein reaching their elevated position for discharge into the tubes to release the seed from the apertures back into the drum when the release wheels are in operative position engaging the drum, said release wheels being spaced from the drum when in inoperative position to permit the seed to be discharged from the drum into seed discharge tubes for planting, and means selectively positioning the movable release wheels in operative and inoperative positions.

6. An improvement for a pneumatic seed planter comprising a plurality of movably supported seed release wheels structured to rollingly engage a rotatable seed drum with holes having seed held therein by air pressure to release the seed from the holes back into the drum when the release wheels are in operative position and spaced from the drum when in inoperative position to permit the seed to be discharged from the drum into seed tubes for planting, and means selectively moving the movable wheels between operative and inoperative positions, said means including a solenoid to move said release wheels.

7. The improvement as defined in claim 5 wherein said means includes bracket means movably mounting said release wheels, spring means biasing the bracket means and release wheels toward said drum, and releasable means retaining said bracket means in a position to space said release wheels from the drum.

8. The improvement as defined in claim 7 wherein said spring means includes a flexible resilient strap forming said bracket means.

9. The attachment as defined in claim 5 wherein said means selectively positioning the movable release wheels in operative and inoperative positions includes a solenoid to independently move each of said release wheels.

* * * * *